(12) United States Patent
Chen et al.

(10) Patent No.: US 11,431,085 B2
(45) Date of Patent: Aug. 30, 2022

(54) ANTENNA STRUCTURE AND WIRELESS COMMUNICATION DEVICE USING SAME

(71) Applicant: Chiun Mai Communication Systems, Inc., New Taipei (TW)

(72) Inventors: Yung-Chin Chen, New Taipei (TW); Yi-Chieh Lee, New Taipei (TW); Kun-Lin Sung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 1 day.

(21) Appl. No.: 17/100,015

(22) Filed: Nov. 20, 2020

(65) Prior Publication Data

US 2021/0151861 A1 May 20, 2021

(30) Foreign Application Priority Data

Nov. 20, 2019 (CN) .......................... 201911143629.0

(51) Int. Cl.
*H01Q 1/24* (2006.01)
*H04B 1/00* (2006.01)
*H01Q 13/10* (2006.01)
*H01Q 5/335* (2015.01)
*H01Q 1/48* (2006.01)

(52) U.S. Cl.
CPC .............. *H01Q 1/243* (2013.01); *H01Q 1/48* (2013.01); *H01Q 5/335* (2015.01); *H01Q 13/10* (2013.01); *H04B 1/006* (2013.01)

(58) Field of Classification Search
CPC ........ H01Q 1/243; H01Q 5/314; H01Q 5/335; H01Q 5/307
See application file for complete search history.

(56) References Cited

U.S. PATENT DOCUMENTS

| 2012/0229347 | A1* | 9/2012 | Jin | H01Q 5/307 343/702 |
| 2015/0280771 | A1* | 10/2015 | Mow | H04B 1/40 455/77 |
| 2018/0159221 | A1* | 6/2018 | Liou | H01Q 9/42 |
| 2021/0126349 | A1* | 4/2021 | Zhou | H01Q 21/0006 |

FOREIGN PATENT DOCUMENTS

CN 204885437 U 12/2015

* cited by examiner

*Primary Examiner* — Ricardo I Magallanes
(74) *Attorney, Agent, or Firm* — ScienBiziP, P.C.

(57) ABSTRACT

An antenna structure with wide radiation bandwidth in a reduced physical space includes a housing, a connection capacitor, and a feed portion. The housing defines at least one gap and a slot dividing the housing into a first radiation portion, a second radiation portion, and a third radiation. The connection capacitor bridges the first gap, connecting the first radiation portion and the second radiation portion. The feed portion is electrically connected to the first radiation portion. The current flows through the first radiation portion and towards the second radiation portion through the connection capacitor. The current is further coupled to the third radiation portion to generate radiation signals in different frequency bands.

16 Claims, 22 Drawing Sheets

ANTENNA STRUCTURE AND WIRELESS COMMUNICATION DEVICE USING SAME

FIELD

The subject matter herein generally relates to wireless communications and a wireless communication device using an antenna structure.

BACKGROUND

Antennas are for receiving and transmitting wireless signals at different frequencies. However, the antenna structure is complicated and occupies a large space in a wireless communication device, which makes miniaturization of the wireless communication device problematic.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
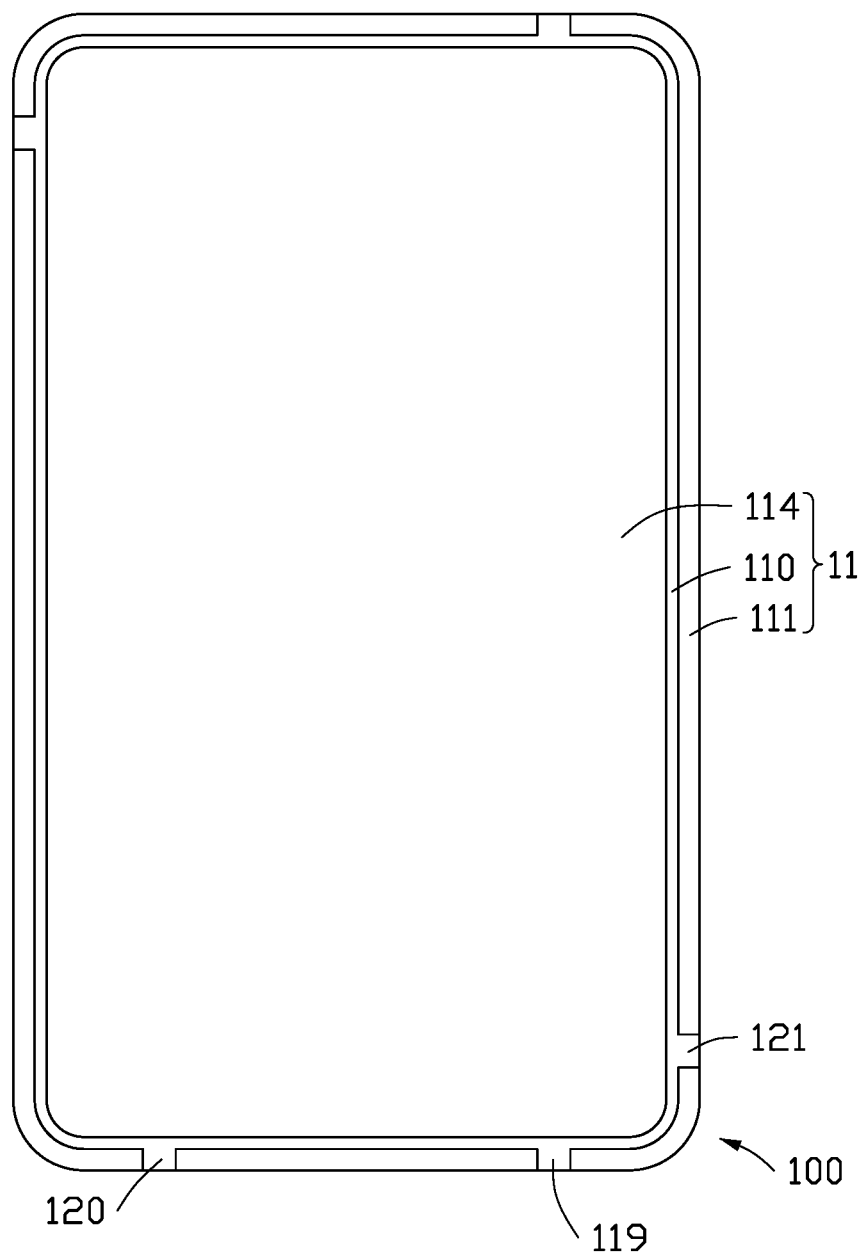
FIG. 1 is a schematic diagram of a first embodiment of a wireless communication device including an antenna structure, shown from a first angle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using same.

Figure 2:
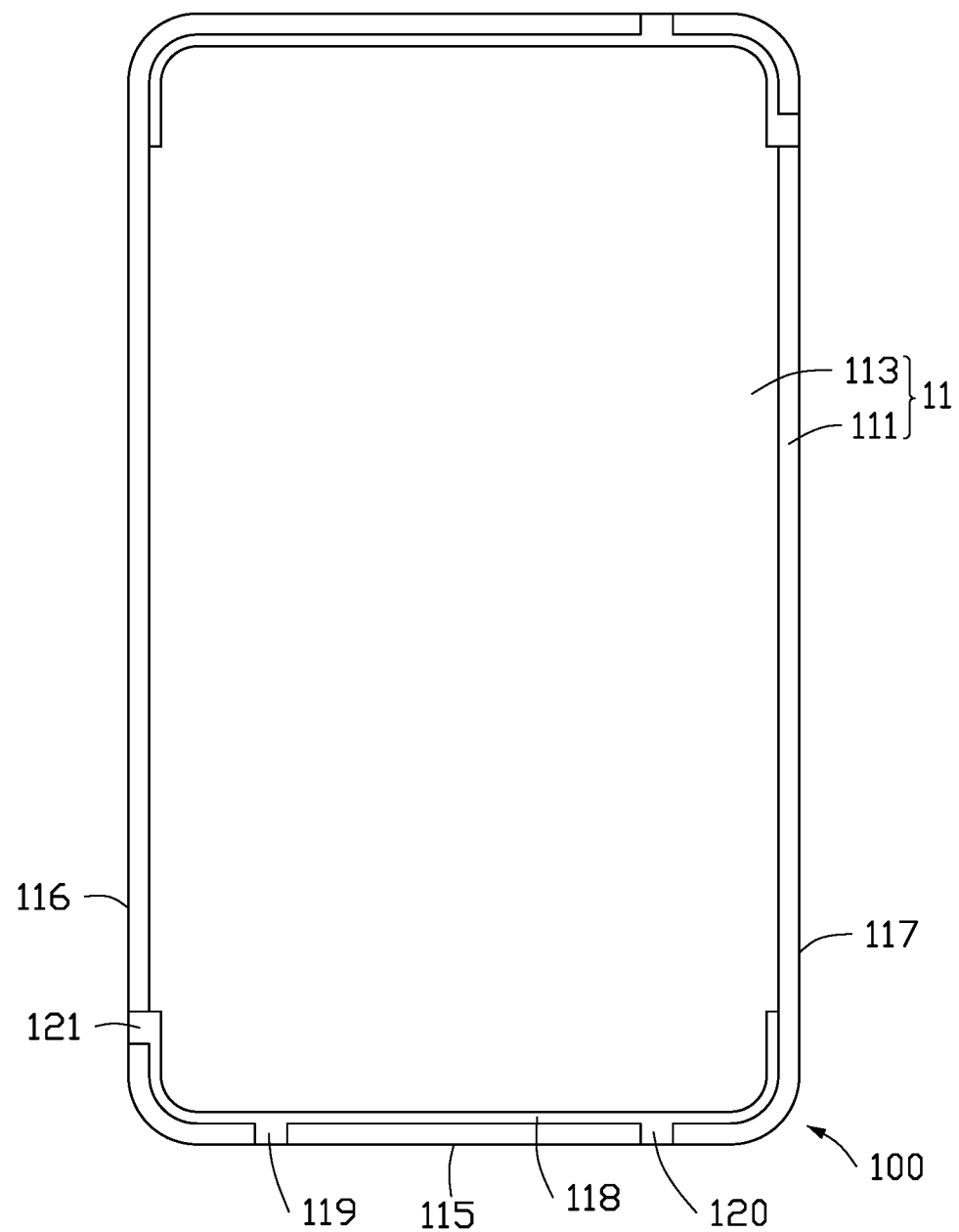
FIG. 2 is similar to FIG. 1, but the wireless communication device being shown from a second angle.
Figure 3:
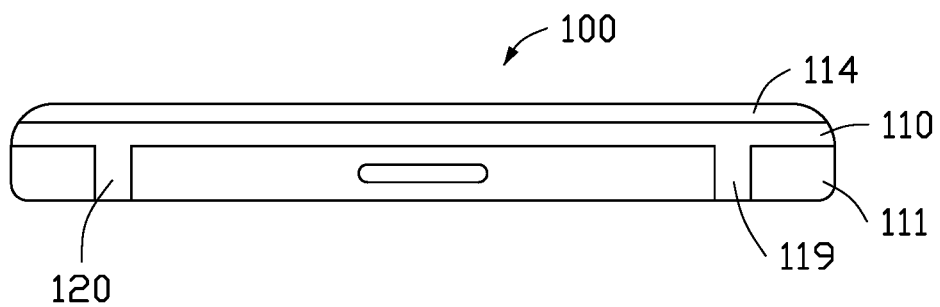
FIG. 3 is similar to FIG. 1, but the wireless communication device being shown from a third angle.
Figure 4:
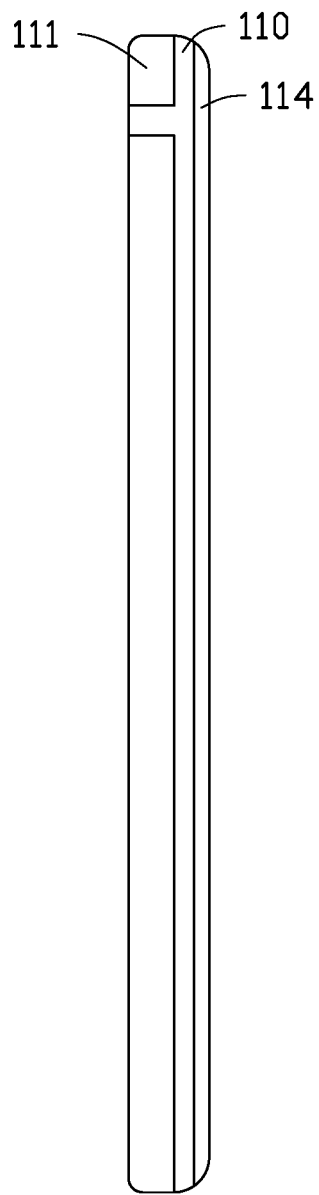
FIG. 4 is similar to FIG. 1, but the wireless communication device being shown from a fourth angle.
Figure 5:
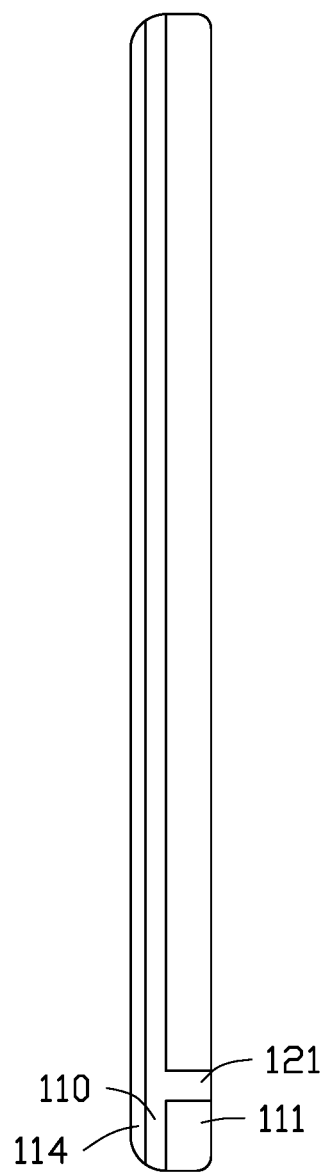
FIG. 5 is similar to FIG. 1, but the wireless communication device being shown from a fifth angle.

FIG. 1, FIG. 2, FIG. 3, FIG. 4, and FIG. 5 illustrate a first embodiment of a wireless communication device 200 using an antenna structure 100. The wireless communication device 200 can be, for example, a mobile phone or a personal digital assistant. The antenna structure 100 can transmit and receive radio waves, to transmit and exchange wireless signals. FIG. 1 is a front view of the antenna structure 100 applied in the wireless communication device 200. FIG. 2 is a back view of the antenna structure 100 applied in the wireless communication device 200. FIG. 3 is a bottom view of the antenna structure 100 applied in the wireless communication device 200. FIG. 4 is a left side view of the antenna structure 100 applied in the wireless communication device 200. FIG. 5 is a right side view of the antenna structure 100 applied in the wireless communication device 200.

Figure 7:
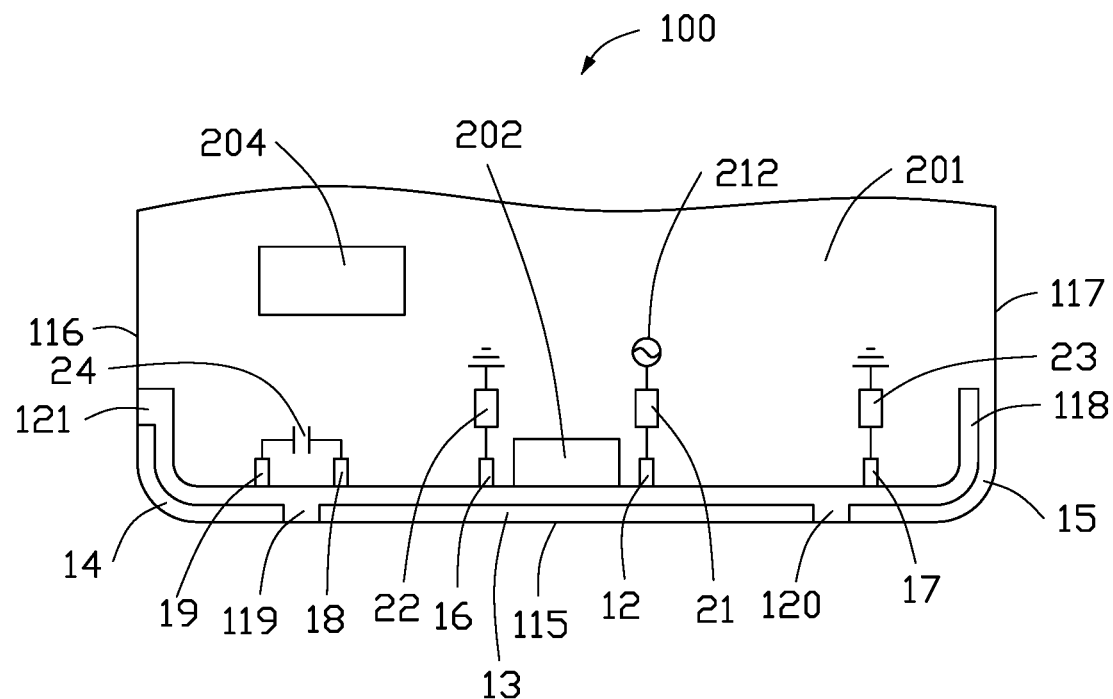
FIG. 7 is a schematic diagram of the antenna structure of the wireless communication device of FIG. 2.

FIG. 7 shows the antenna structure 100 of FIG. 2 applied in the wireless communication device 200. The antenna structure 100 includes a housing 11, a feed portion 12, a first radiation portion 13, a second radiation portion 14, a third radiation portion 15, a first ground portion 16, a second ground portion 17, a first connection portion 18, a second connection portion 19, a matching circuit 21, a first switch circuit 22, a second switch circuit 23, and a connection capacitor 24.

The housing 11 of the antenna structure 100 may be a housing of the wireless communication device 200. The housing 11 includes a system ground plane 110, a metallic side frame 111, a metallic middle frame 112, a metallic back board 113, and a front cover 114. The metallic side frame 111, the metallic middle frame 112, and the metallic back cover 113 may be integrally formed.

Figure 6:
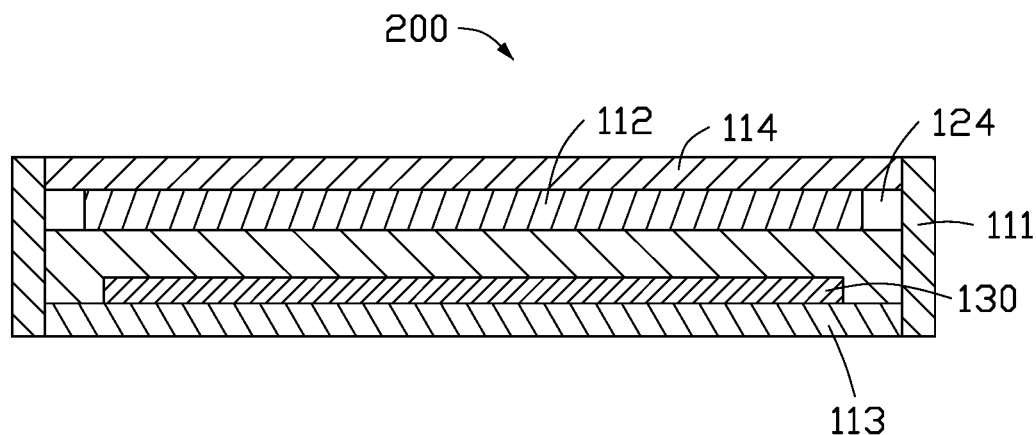
FIG. 6 is a cross-sectional view of the wireless communication device of FIG. 1.

As illustrated in FIG. 6, the metallic side frame 111, the metallic middle frame 112, the metallic back board 113, and the front cover 114 form a space. The space receives electronic components or circuit modules (for example, a circuit board 130, and/or a processing unit) of the wireless communication device 200. In this embodiment, the electronic components include at least a universal serial bus (USB) connector 202 and a speaker 204. The USB connector 202 and the speaker 204 are arranged on the circuit board 130 of the wireless communication device 200. In this embodiment, the circuit board 130 is stacked or spaced on the metallic back cover 113. The system ground plane 110 may be made of metal or other conductive materials, to provide a ground for the antenna structure 100.

The metallic side frame 111 is substantially a ring structure. The metallic side frame 111 is made of metal or other conductive materials. The metallic side frame 111 is positioned at a periphery of the system ground plane 110. That is, the metallic side frame 111 is positioned around the system ground plane 110. In this embodiment, an edge of one side of the metallic side frame 111 is positioned so as to be spaced from the system ground plane 110, and a headroom 124 (shown in FIG. 6) is formed between the metallic side frame 111 and the system ground plane 110.

In this embodiment, a distance between the metallic side frame 111 and the system ground plane 110 can be adjusted according to requirements. For example, the distance between the metallic side frame 111 and the system ground plane 110 at different locations can be different distances.

The metallic middle frame 112 is substantially a rectangular sheet. The metallic middle frame 112 is made of metal or other conductive materials. A shape and size of the metallic middle frame 112 are slightly less than those of the system ground plane 110. The metallic middle frame 112 is stacked on the system ground plane 110.

In this embodiment, an opening (not shown) is defined on a side of the metallic side frame 111 near the metallic middle frame 112, for receiving the front cover 114. In this embodiment, the front cover 114 can be a display unit. The display unit has a display plane, and the display plane is exposed through the opening. In one embodiment, the display unit can cover a front surface of the wireless communication device 200 to form a full-screen structure. The metallic middle frame 112 is used to support the display unit 201, provide electromagnetic shielding, and improve mechanical strength of the wireless communication device 200.

The metallic back board 113 is made of metal or other conductive materials. The metallic back board 113 is positioned at an edge of the metallic side frame 111. There is no gap between the metallic back cover 113 and the metallic side frame 111. In this embodiment, the metallic back board 113 is positioned at a side of the system ground plane 110 facing away from the metallic middle frame 112, and is in parallel with the display plane of the display unit and the metallic middle frame 112.

In this embodiment, the metallic side frame 111 includes at least an end portion 115, a first side portion 116, and a second side portion 117. The end portion 115 is a bottom end of the wireless communication device 200. That is, the antenna structure 100 constitutes a lower antenna of the wireless communication device 200. The first side portion 116 and the second side portion 117 are positioned opposite to each other. The first side portion 116 and the second side portion 117 are each disposed at one end of the end portion 115, and are preferably disposed vertically.

The housing 11 defines a slot 118 and at least one gap. The slot 118 is defined on the metallic back board 113. The slot 118 is substantially U-shaped, and defined at a side of the metallic back board 113 near the end portion 115 extending towards the first side portion 116 and the second side portion 117.

In this embodiment, the housing 11 defines three gaps, namely a first gap 119, a second gap 120, and a third gap 121. The first gap 119, the second gap 120, and the third gap 121 are defined on the metallic side frame 111. The first gap 119 and the second gap 120 are both defined at the end portion 115. The first gap 119 is positioned near the first side portion 116. The second gap 120 is positioned near the second side portion 117. The third gap 121 is spaced from the first gap 119. The third gap 121 is defined at the first side portion 116 near the end portion 115. The first gap 119, the second gap 120, and the third gap 121 all penetrate and interrupt the metallic side frame 111, and communicate with the slot 118.

The slot 118 and the at least one gap cooperatively divide at least three radiation portions from the housing 11. In this embodiment, the slot 118, the first gap 119, the second gap 120, and the third gap 121 divide the housing 11 into three radiation portions, namely the first radiation portion 13, the second radiation portion 14, and the third radiation portion 15. In this embodiment, the metallic side frame 111 between the first gap 119 and the second gap 120 forms the first radiation portion 13. The metallic side frame 111 between the first gap 119 and the third gap 121 forms the second radiation portion 14. The metallic side frame 111 between the second gap 120 and an endpoint of the slot 118 located at the second side portion 117 forms the third radiation portion 15. A length of the first radiation portion 13 is greater than a length of the second radiation portion 14 and greater than a length of the third radiation portion 15.

In this embodiment, a side of the third radiation portion 15 near an end of the slot 118 at the second side portion 117 is connected to the metallic back cover 113, that is, grounded. Then, in this embodiment, the slot 118 separates the frame radiators (that is, the first radiation portion 13, the second radiation portion 14, and the third radiation portion 15) and the metallic back cover 113. Portions other than the slot 118, the metallic side frame 111, and the metallic back board 113 are connected.

In this embodiment, the first gap 119 and the second gap 120 have the same width. The third gap 121 and the slot 118 have the same width. A width of the slot 118 is less than or equal to twice the width of the first gap 119 or the second gap 120. The width of the slot 118 is 0.5-2 mm. The width of each of the first gap 119 and the second gap 120 is 1-2 mm.

In this embodiment, the slot 118, the first gap 119, the second gap 120, and the third gap 121 are all filled with an insulating material (such as plastic, rubber, glass, wood, ceramic, etc., but not limited to these). Except for the gaps 119, 120, 121 and the slot 118, no other insulating slots, and/or gaps are defined in a lower half of the metallic back cover 113.

In this embodiment, the USB connector 202 is positioned adjacent to a middle location of the first radiation portion 13 and is insulated from the first radiation portion 13 through the slot 118. The speaker 204 is positioned on a side of the first radiation portion 13 and corresponds to the first gap 119.

In this embodiment, one end of the feed portion 12 is electrically connected to a side of the first radiation portion 13 near the second gap 120. Through the matching circuit 21, the other end of the feed portion 12 is electrically connected to a feeding source 212 on the circuit board 130, this may be by means of an elastic sheet, a microstrip line, a strip line, or a coaxial cable. The feed portion 12 feeds current and signals to the first radiation portion 13. The matching circuit 21 enables the feeding signal of the feeding source 212 to be fed to the first radiation portion 13 to obtain a better impedance matching.

In this embodiment, impedance matching means the impedance matching between the feeding source 212 and an antenna end (that is, the frame radiation portions, such as the first radiation portion 13, the second radiation portion 14, and the third radiation portion 15).

In this embodiment, the feed portion 12, the first ground portion 16, the second ground portion 17, the first connection portion 18, and the second connection portion 19 may be made of iron, metal copper foil, or a conductor in a laser direct structuring (LDS) process.

Figure 8:
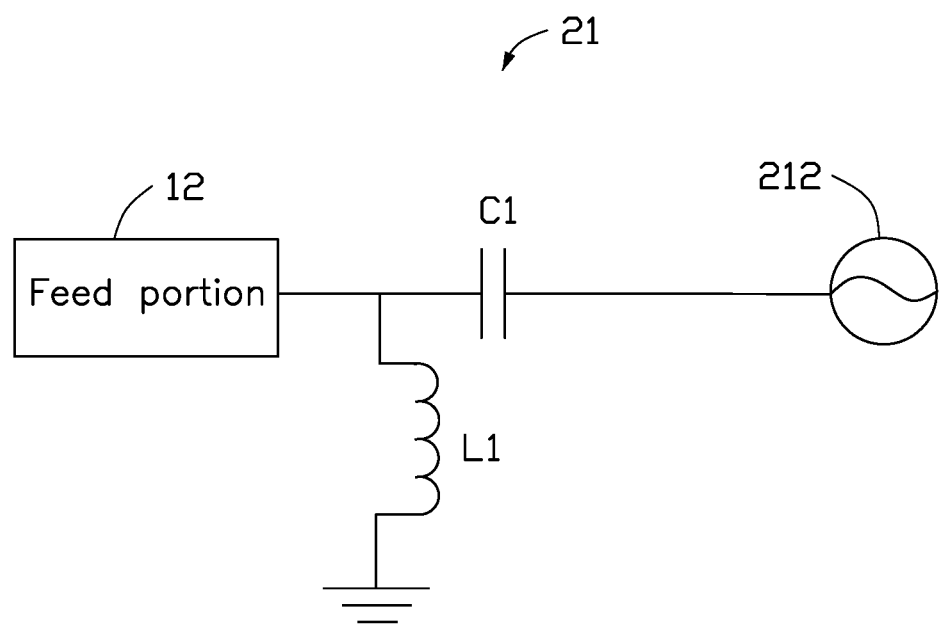
FIG. 8 is a circuit diagram of a matching circuit of the antenna structure of FIG. 7.

As illustrated in FIG. 8, the matching circuit 21 includes a first capacitor C1 and the first inductor L1. One end of the first capacitor C1 is electrically connected to the feed portion 12. The other end of the first capacitor C1 is electrically connected to the first radiation portion 13. One end of the first inductor L1 is electrically connected between the feed portion 12 and the first capacitor C1. The other end of the first inductor L1 is grounded.

In this embodiment, the first ground portion 16 is spaced apart from the feed portion 12. One end of the first ground portion 16 is connected to the first radiation portion 13. The other end of the first ground portion 16 is electrically connected to the ground plane through the first switch circuit 22. In this embodiment, the first ground portion 16 and the feed portion 12 are on opposite sides of the USB connector 202.

Figure 9:
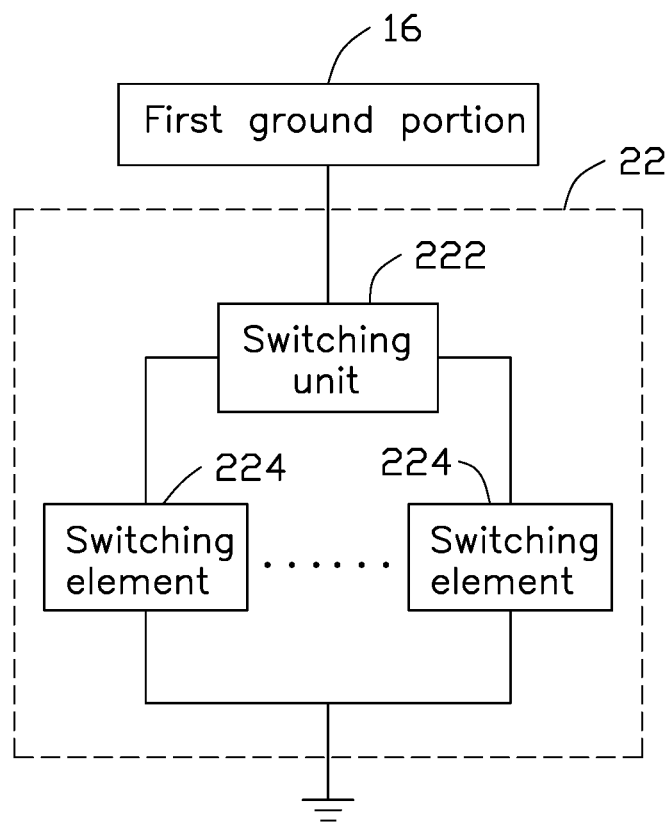
FIG. 9 is a circuit diagram of a first switch circuit of the antenna structure of FIG. 7.

As illustrated in FIG. 9, in this embodiment, the first switch circuit 22 includes a switching unit 222 and a plurality of switching elements 224. The switching unit 222 is electrically connected to the first ground portion 16. The switching elements 224 can be inductors, capacitors, or a combination of them. The switching elements 224 are connected in parallel to each other. One end of each switching element 224 is electrically connected to the switching unit 222. The other end of each switching element 224 is grounded. The switching unit 222 can switch the first radiation portion 11, through the first ground portion 16, to connect with different switching elements 224. Each switching element 224 has a different impedance.

The second ground portion 17 is positioned adjacent to the second gap 120. One end of the second ground portion 17 is connected to the side of the third radiation portion 15 near the second gap 120. The other end of the second ground portion 17 is electrically connected to the system ground plane through the second switch circuit 23. In this embodiment, a structure of the second switch circuit 23 is substantially the same as the structure of the first switch circuit 22, and is not be repeated here.

The first connection portion 18 and the second connection portion 19 are spaced on both sides of the first gap 119. The first connection portion 18 is connected to a side of the first radiation portion 13 near the first gap 119. The second connection portion 19 is connected to a side of the second radiation portion 14 near the first gap 119.

Two opposite ends of the connection capacitor 24 are electrically connected to the first connection portion 18 and the second connection portion 19, and cross the first gap 119.

The matching circuit 21, the first switching circuit 22, and the second switching circuit 23 can be positioned on the circuit board 130.

Figure 10:
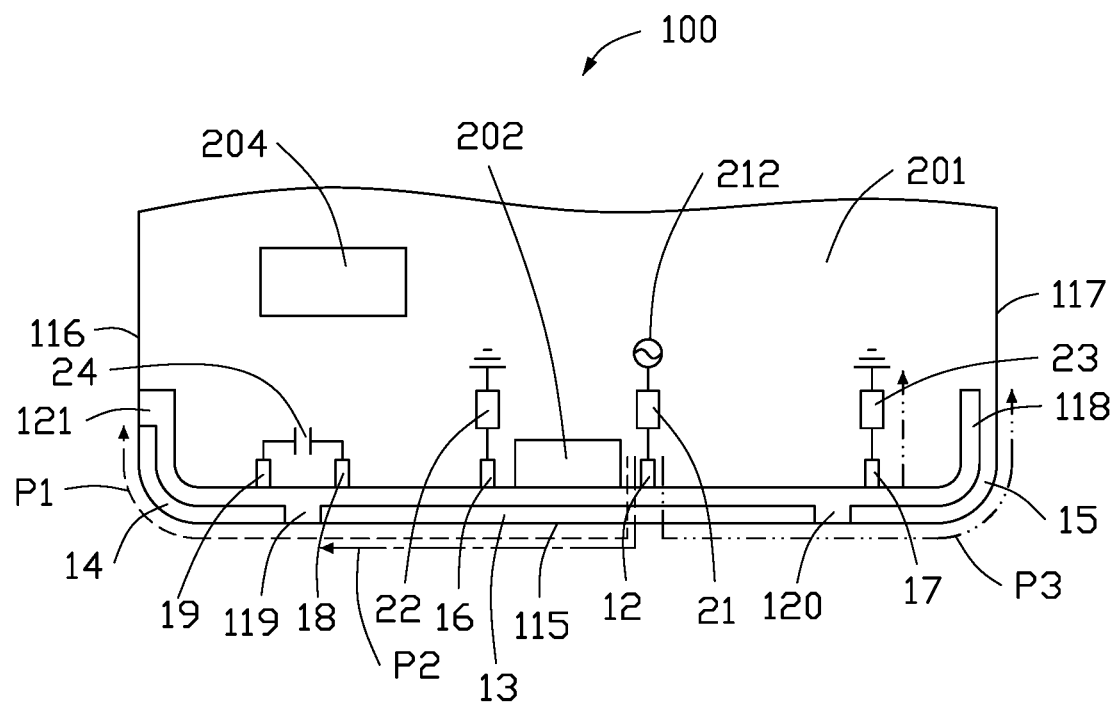
FIG. 10 is a current path distribution graph of the antenna structure of FIG. 7.

FIG. 10 illustrates current paths of the antenna structure 100. When the feed portion 12, through the matching circuit 21, supplies a current from the feed source 212, the current flows in two directions. One direction is the current flowing to the first gap 119 along the first radiation portion 13, towards the second radiation portion 14 through the first connection portion 18, the connection capacitor 24, and the second connection portion 19, and to the third gap 121 along the second radiation portion 14 (path P1), to excite a first working mode and generate a radiation signal in a first radiation frequency band. In this embodiment, the first working mode is a Long Term Evolution Advanced (LTE-A) low frequency mode. The frequency of the first radiation frequency band is 700-960 MHz.

When the feed portion 12 supplies a current, the current will flow to the first gap 119 along the first radiation portion 13 (path P2), to excite a second working mode and generate a radiation signal in a second radiation frequency band. In this embodiment, the second working mode is an LTE-A middle frequency mode. The frequency of the second radiation frequency band is 1710-2170 MHz.

When the feed portion 12 supplies a current, the current flows towards the second gap 120 along the first radiation portion 13 in another direction. The third radiation portion 15 is coupled to obtain the current, and the current flows to the end along the third radiation portion 15 and to the ground plane through the second ground portion 17 and the second switch circuit 23, namely ground (path P3), and a third working mode is excited to generate a radiation signal in a third radiation frequency band. In this embodiment, the third working mode is an LTE-A high-frequency mode. The frequency of the third radiation frequency band is 2300-2690 MHz.

In this embodiment, under the control of the switching unit 222, the first radiation portion 13 can be switched to connect with different switching elements 224. Each switching element 224 has a different impedance, the first radiation frequency band of the first working mode can be changed by switching the switching unit 222. For example, the first radiation frequency band can be offset towards a lower frequency or offset towards a higher frequency (relative to each other). That is, the low frequency band is adjusted by the first switch circuit 22, and the high frequency band is adjusted by the second switch circuit 23.

In this embodiment, the connection capacitor 24 allows the current of the first working mode (that is, the low frequency mode) to pass, so that the current enters the second radiation portion 14 from the first radiation portion 13 through the connection capacitor 24. The capacitor 24 also blocks current in the middle frequency mode and the high frequency mode.

In this embodiment, the ground plane may be the metallic back cover 113. The metallic middle frame 112 is a shielding mask for shielding electromagnetic interference and used for supporting the front cover 114. The ground plane may also be the metallic middle frame 112. Alternatively, the metallic back cover 113 can also be connected to the metallic middle frame 112 to form a larger ground plane. The ground plane is the ground of the antenna structure 100. In other words, each ground portion is directly connected or indirectly connected to the ground plane.

Figure 11A:
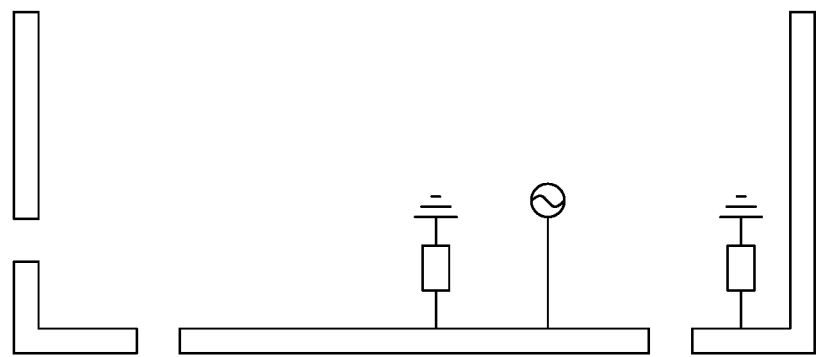
FIGS. 11A, 11B, and 11C are isometric views of architecture of low frequency conventional antenna and the antenna structure of FIG. 7.
Figure 11B:
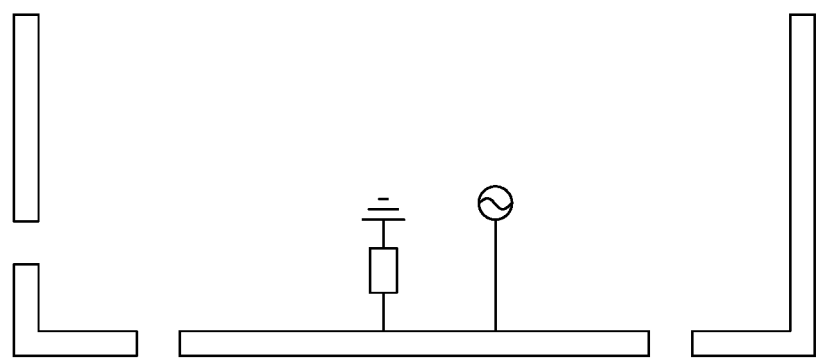
Figure 11C:
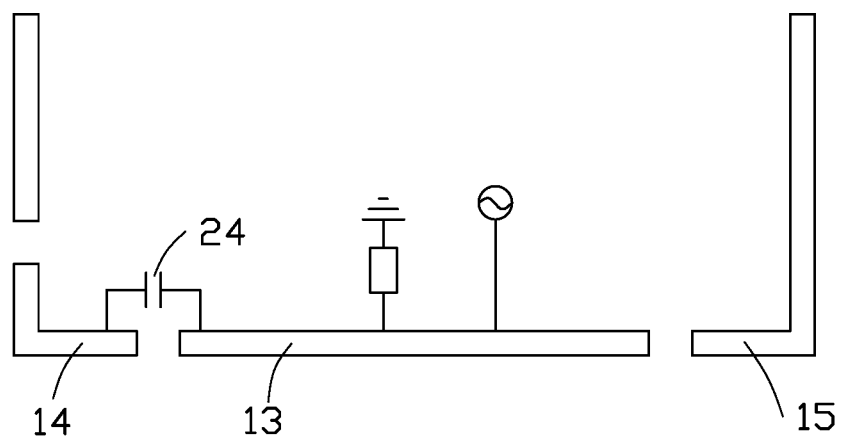

As illustrated in FIG. 11A, FIG. 11B, low frequency architecture of a conventional antenna is shown. FIG. 11C is a schematic diagram of the low frequency architecture of the antenna structure 100 of this embodiment. Compared with the low frequency architecture of the conventional antenna, the low frequency architecture of the antenna structure 100 of this disclosure utilizes the connection capacitor 24 at the first gap 119 so that current can pass from the first radiation portion 13 to the second radiation portion 14 through the connection capacitor 24.

Figure 12:
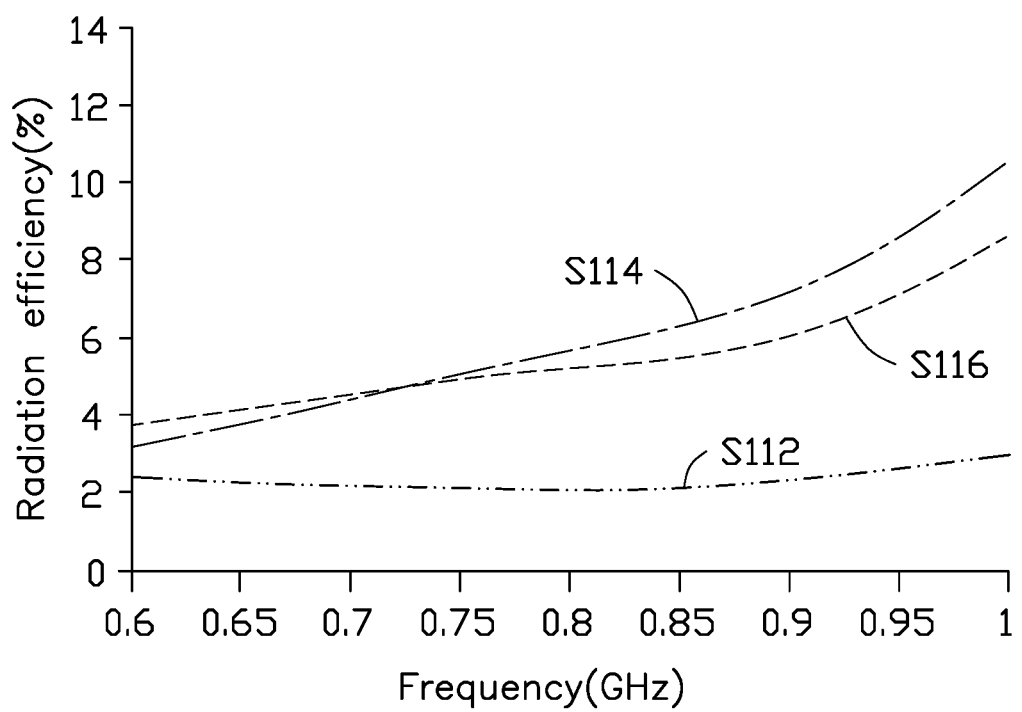
FIG. 12 is a return loss graph of the antenna structure of FIG. 7, when the antenna structure is held in the hand.

FIG. 12 is a graph of radiation efficiency of the antenna structure 100 when handheld. A curve S112 is a radiation efficiency when the conventional antenna of FIG. 11A is handheld and working in the low frequency band (700-960 MHz). A curve S114 is a radiation efficiency when the conventional antenna of FIG. 11B is handheld and working in the low frequency band. A curve S116 is a radiation efficiency when the antenna structure 100 of FIG. 11C is handheld and working in the low frequency band. Then, when the wireless communication device 200 is handheld by the user, the third gap 121 is short-circuited.

Figure 13:
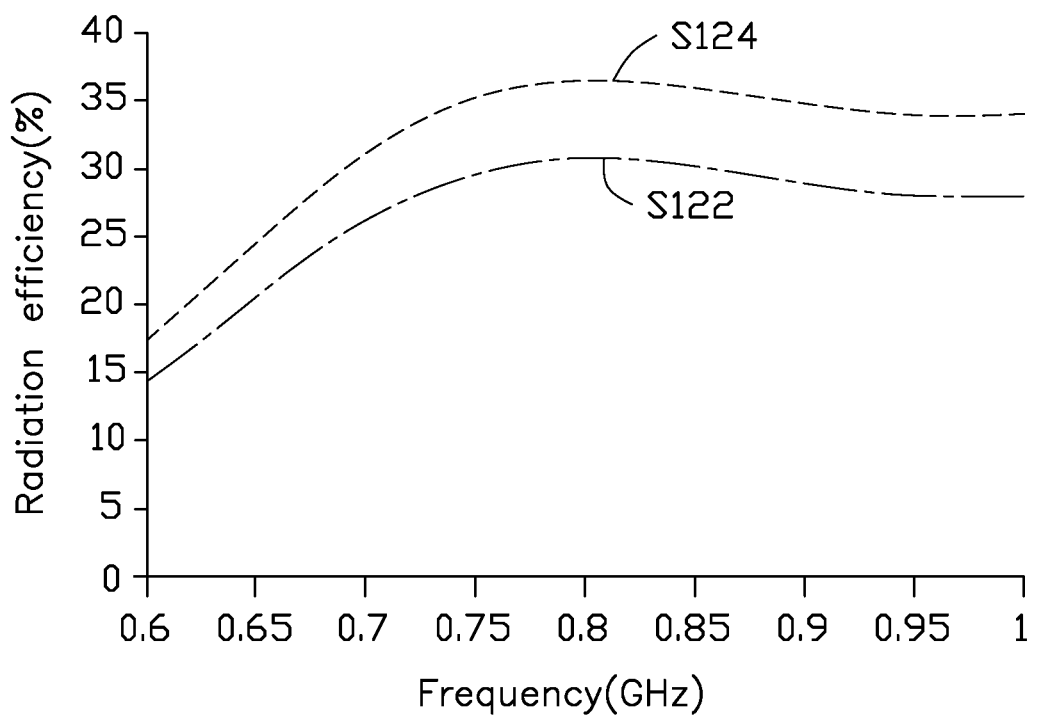
FIG. 13 is a total radiation efficiency graph of the antenna structure of FIG. 7, when the antenna structure is not held in the hand.

FIG. 13 is a graph of radiation efficiency of the antenna structure 100 when not held in the hand. A curve S122 is a radiation efficiency when the conventional antenna of FIG. 11B is not handheld and working in the low frequency band. A curve S124 is a radiation efficiency when the antenna structure 100 of FIG. 11C is not handheld and working in the low frequency band. Then, when the antenna structure 100 of the present disclosure works in the low frequency band, it has better radiation efficiency than the conventional antenna structure whether handheld or not handheld.

Figure 14:
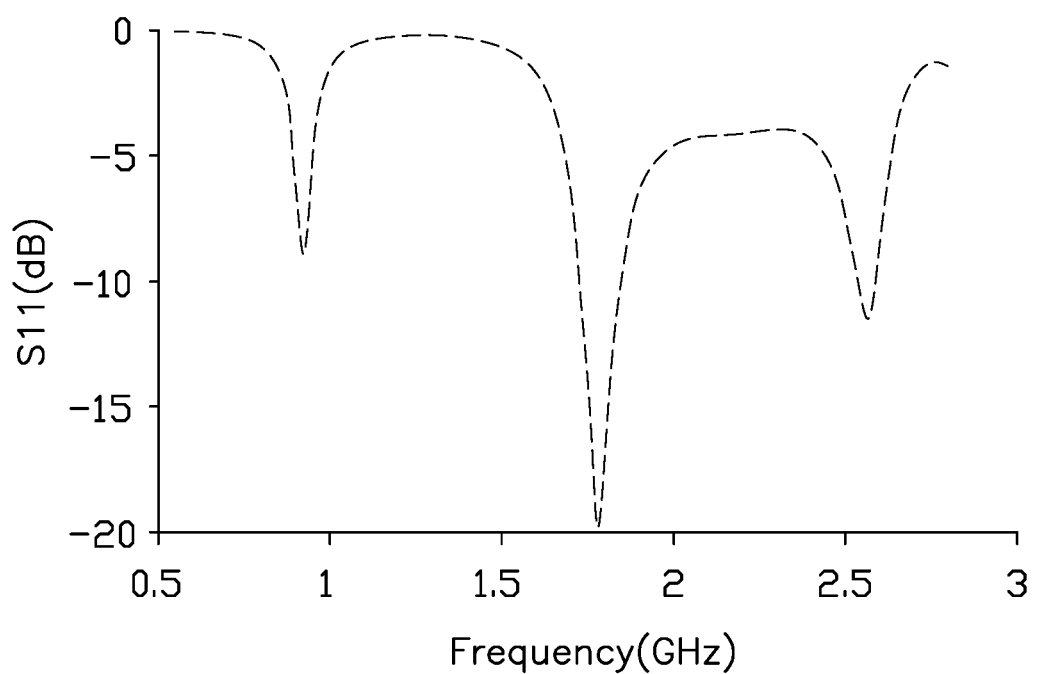
FIG. 14 is a return loss graph of the antenna structure of FIG. 7.
Figure 15:
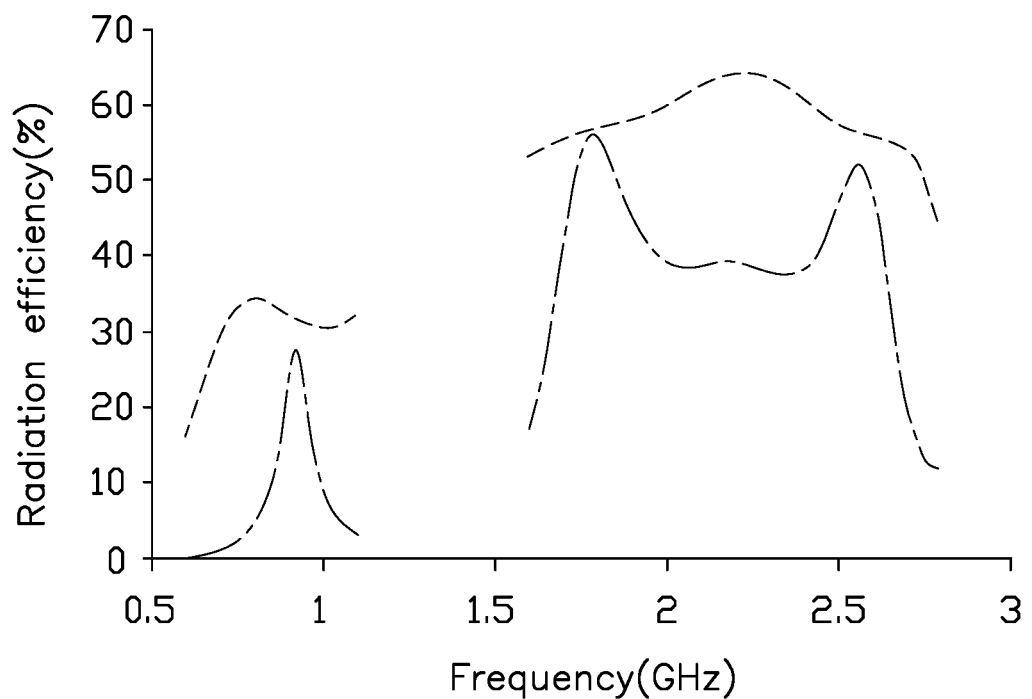
FIG. 15 is a total radiation efficiency graph of the antenna structure of FIG. 7.

FIG. 14 is a graph of return loss (Return Loss) of the antenna structure 100 during operation. FIG. 15 is a graph of total radiation efficiency (Efficiency) of the antenna structure 100 during operation.

Figure 16:
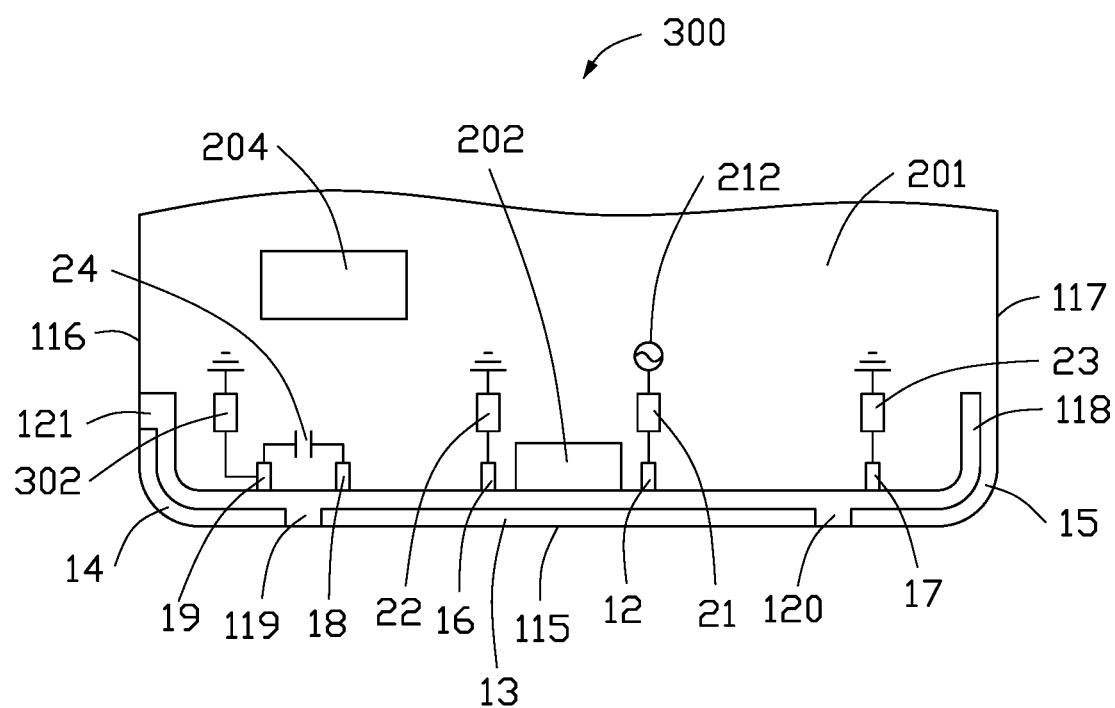
FIG. 16 is a schematic diagram of a second embodiment of a wireless communication device with an antenna structure.

FIG. 16 illustrates an antenna structure 300 in accordance with a second embodiment of the present disclosure. In this embodiment, the antenna structure 300 is similar to the antenna structure 100, being different from the antenna structure 100 in that the antenna structure 300 further includes a third switching circuit 302. One end of the third switch circuit 302 is electrically connected to the second connection portion 19. The other end of the third switch circuit 302 is grounded. In this embodiment, there can be various specific structures of the third switch circuit 302. For example, the third switch circuit 302 can include, but is not limited to, a single switch, a multiple switch, a single switch with matching components, or a multiple switch with matching components. When the third switch circuit 302 is turned off, the architecture of the antenna structure 300 of the second embodiment is the same as the antenna structure 100 of the first embodiment. When the third switch circuit 302 is turned on, the second radiation portion 14 is grounded through the third switch circuit 302, and the current can flow to the second radiation portion 14 which is also grounded, through the third switch circuit 302.

Figure 17:
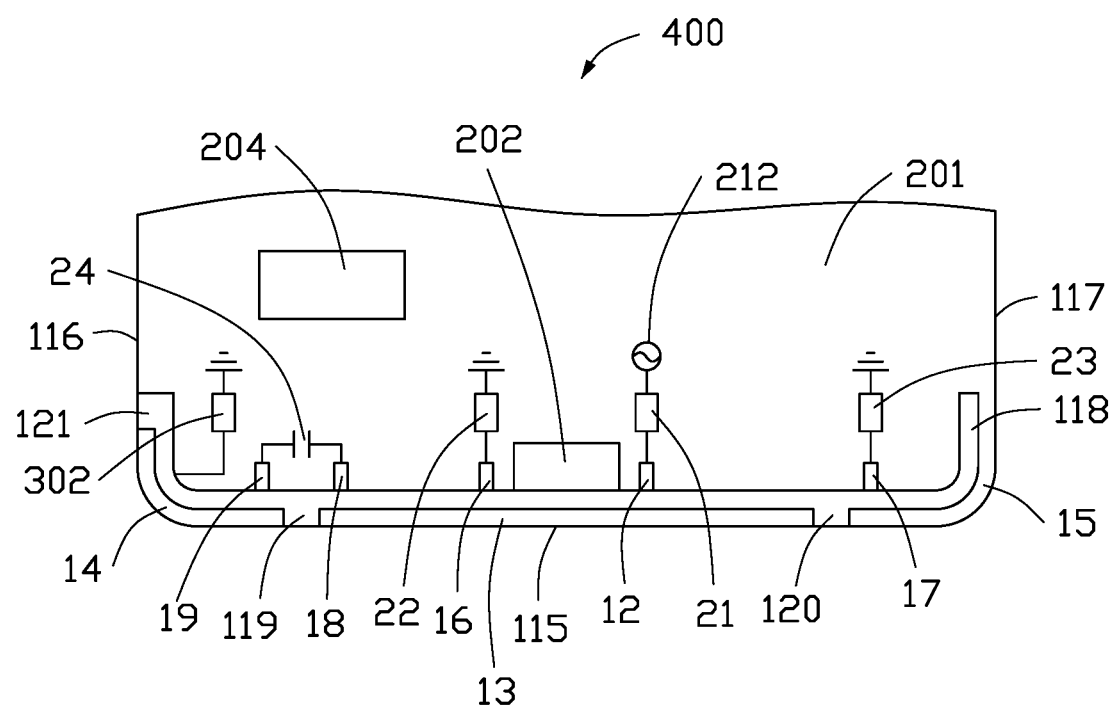
FIG. 17 is a schematic diagram of a third embodiment of a wireless communication device with an antenna structure.

FIG. 17 illustrates an antenna structure 400 in accordance with a third embodiment of the present disclosure. In this embodiment, the antenna structure 400 is similar to the antenna structure 300 of the second embodiment, being different from the antenna structure 300 in that one end of the third switch circuit 302 of the antenna structure 400 is electrically connected to the second radiation portion 14. The other end of the third switch circuit 302 is grounded. A working mode of the antenna structure 400 of the third embodiment is substantially the same as that of the antenna structure 300 of the second embodiment, and is not repeated here.

Figure 18:
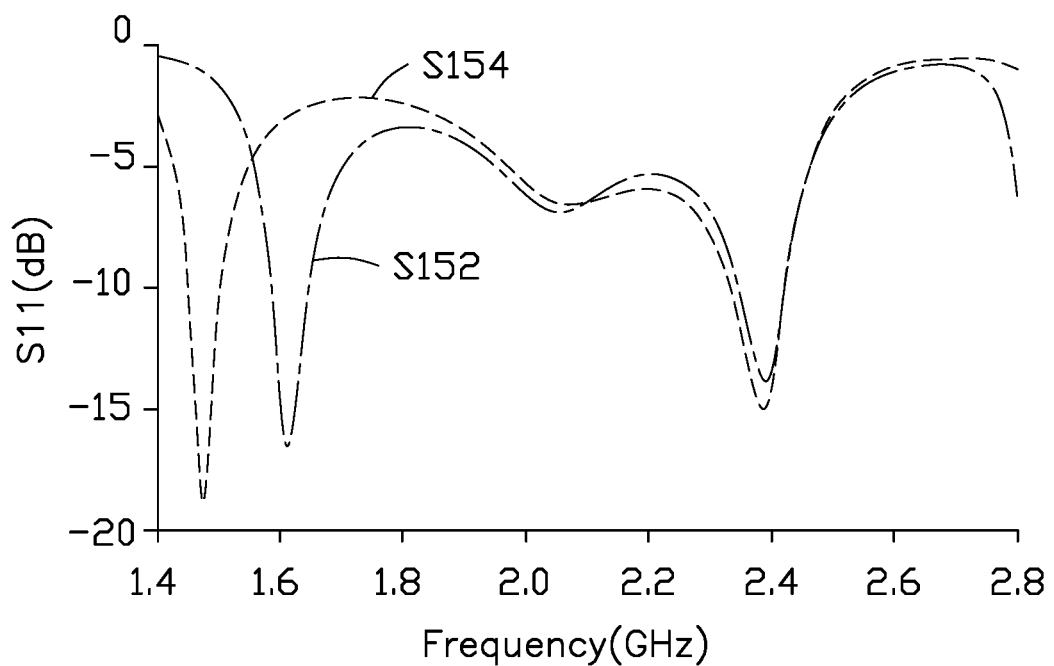
FIG. 18 is a return loss graph of the antenna structure of FIG. 16 and FIG. 17.

FIG. 18 is a graph of return loss (Return Loss) in operation of the antenna structures 300 and 400 of the second and third embodiments. A curve S152 is a return loss of the antenna structures 300 and 400 when the third switch circuit 302 is turned off. A curve S154 is a return loss of the antenna structures 300 and 400 when the third switch circuit 302 is turned on.

Figure 19:
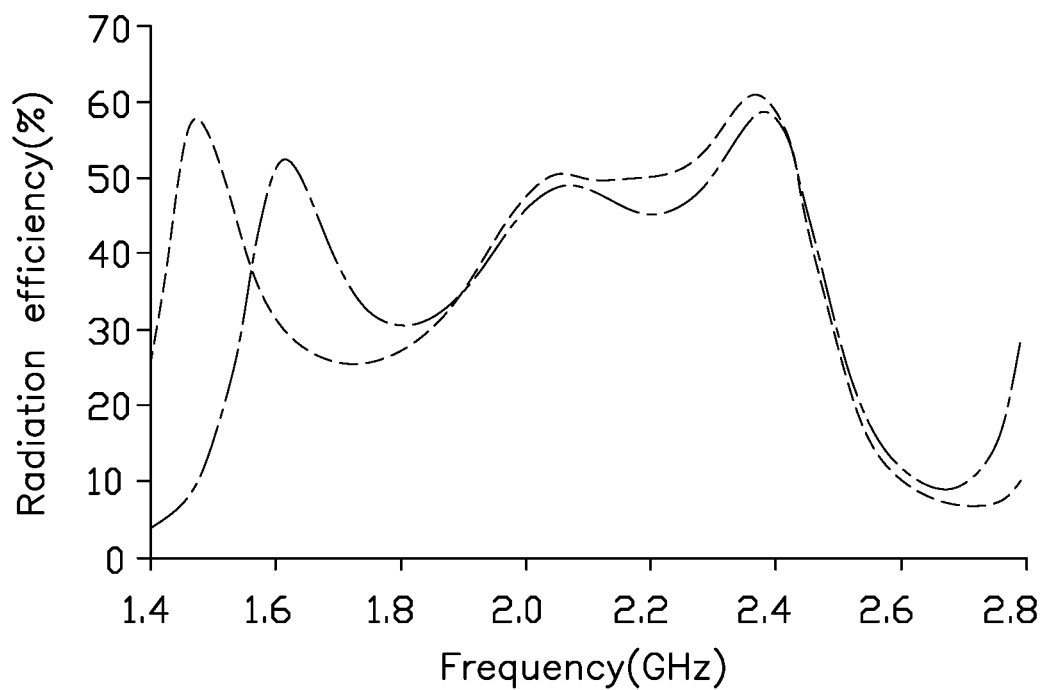
FIG. 19 is a total radiation efficiency graph of the antenna structure of FIG. 16 and FIG. 17.
Figure 20:
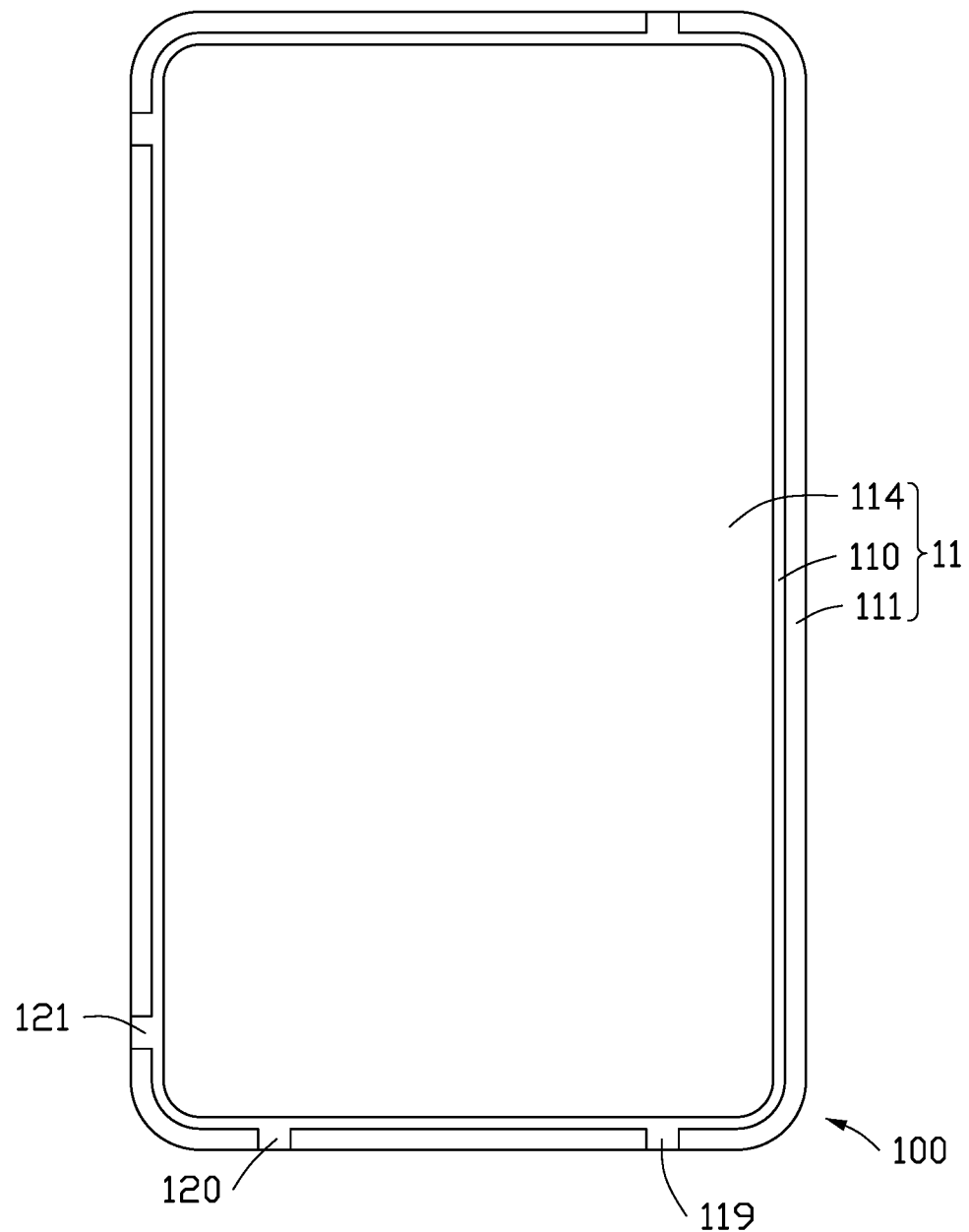
FIG. 20 is a schematic diagram of a fourth embodiment of a wireless communication device with an antenna structure, shown from the first angle.
Figure 21:
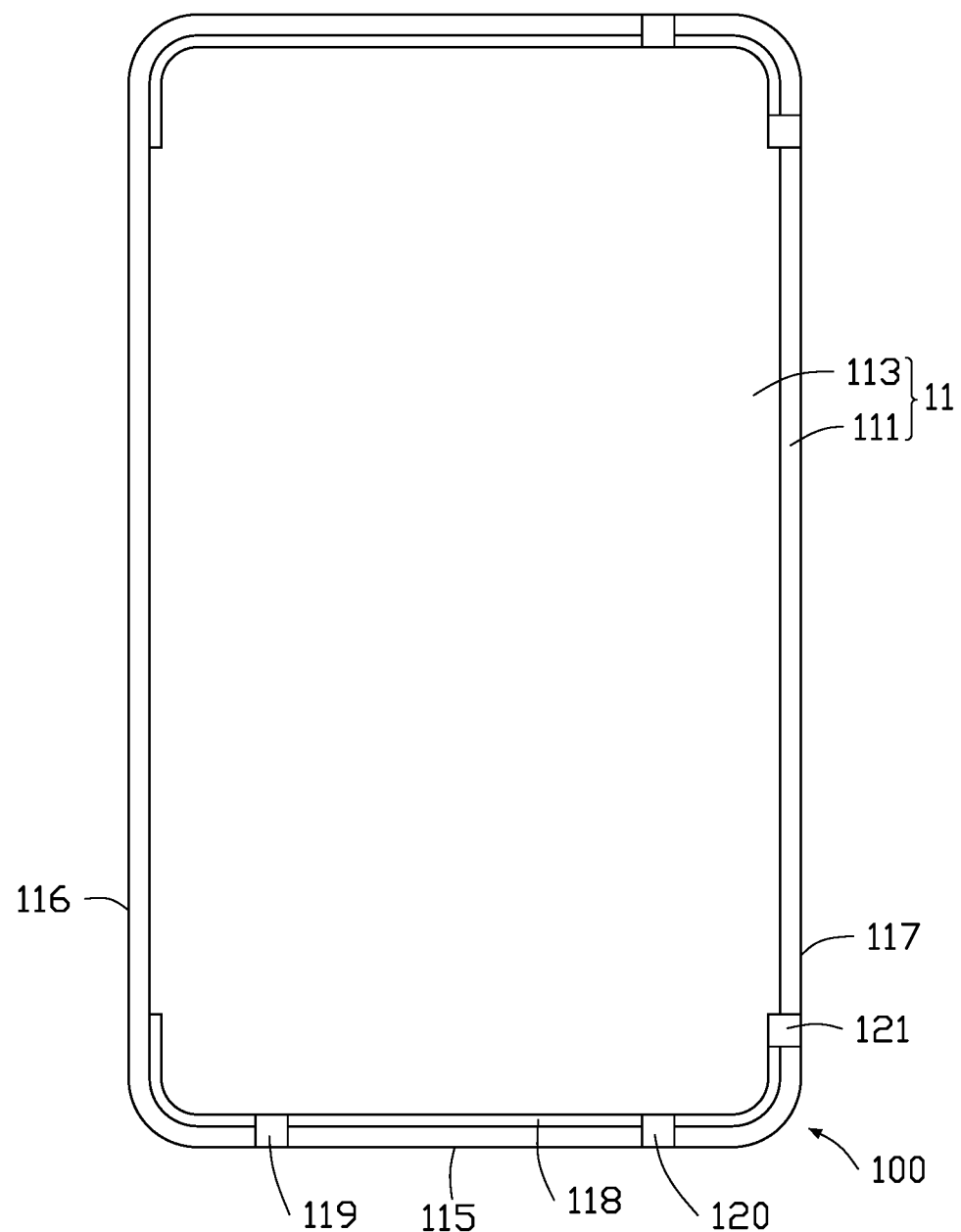
FIG. 21 is similar to FIG. 20, but the wireless communication device being shown from the second angle.
Figure 22:
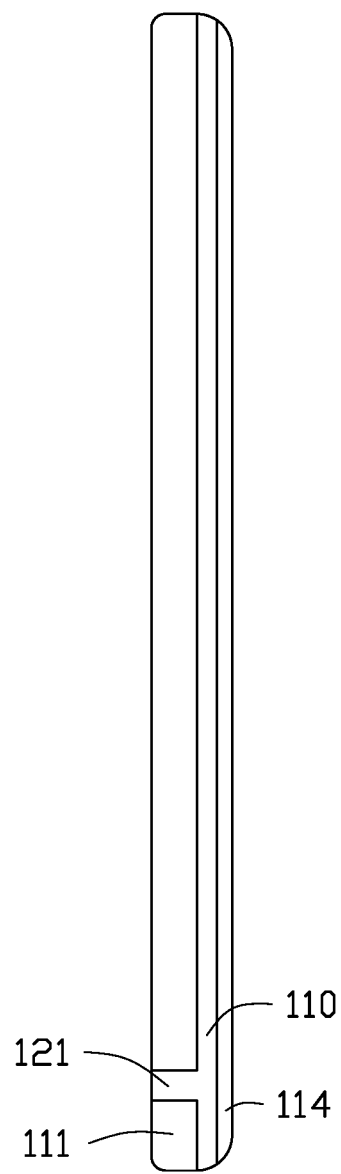
FIG. 22 is similar to FIG. 20, but the wireless communication device being shown from the fourth angle.
Figure 23:
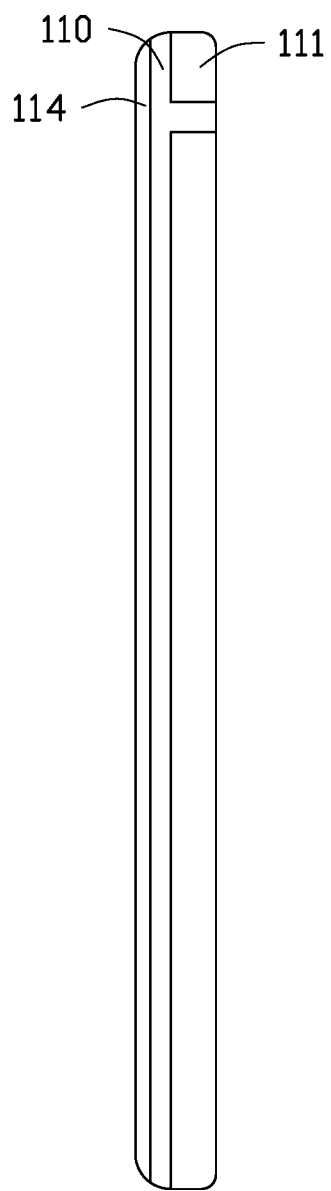
FIG. 23 is similar to FIG. 20, but the wireless communication device being shown from the fifth angle.

FIG. 19 is a graph of radiation efficiency (Efficiency) in operation of the antenna structures 300 and 400 of the second and third embodiments. A curve S162 is a radiation efficiency of the antenna structures 300 and 400 when the third switch circuit 302 is turned off. A curve S164 is a radiation efficiency of the antenna structures 300 and 400 when the third switch circuit 302 is turned on.

FIGS. 20, 21, 22, and 23 are schematic diagrams of the antenna structure 500 of the fourth embodiment applied in the wireless communication device 200. The antenna structure 500 of the fourth embodiment has substantially the same structure as that of the antenna structures 100, 300, and 400 of the first, second, and third embodiments. In the antenna structure 500, the third gap 121 is defined on the second side portion 117 and there is no gap defined on the first side portion 116. Correspondingly, the connection capacitor 24 and the third switch circuit 302 are set corresponding to the second gap 120. That is, the antenna structure 500 of the fourth embodiment and the antenna structures 100, 300, and 400 of the first, second, and third embodiments are mirrored in design.

The antenna structures 100, 300, 400, 500 each set at least one gap (such as the first gap 119, the second gap 120, and the third gap 121) on the metallic side frame 111 to create at least three radiation portions from the metallic side frame 111. The antenna structures 100, 300, 400, 500 are further provided with the connection capacitor 24 corresponding to the first gap 119, to connect the first radiation portion 13 and the second radiation 14. The antenna structures 100, 300, 400, 500 further include the first switch circuit 22, the second switch circuit 23, and the third switch circuit 302. Therefore, multiple frequency bands such as low frequency, middle frequency, and high frequency can be covered through different switching methods, meeting the carrier aggregation application (CA) of LTE-A, and rendering wireless radiation of the antenna structures 100, 300, 400, 500 more effective in broadband ranges compared to a general metal back. In addition, the antenna structures 100, 300, 400, 500 each has a front full screen, and the antenna structures 100, 300, 400, 500 still have good performance in the less-than-optimal environment of the metallic back board 113, the metallic side frame 111, the metallic middle frame 112, together with a large area of grounded metal around it.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:
a housing, the housing comprising a metallic side frame and a metallic back board, the metallic side frame positioned at a periphery of the metallic back board, wherein the metallic side frame defines a first gap, a second gap, and a third gap, the metallic back board defines a slot, the slot and the three gaps divide a first radiation portion, a second radiation portion, and a third radiation portion from the metallic side frame; wherein the metallic side frame between the first gap and the second gap forms the first radiation portion, the metallic side frame between the first gap and the third gap forms the second radiation portion, the metallic side frame between the second gap and an endpoint of the slot forms the third radiation portion;
a connection capacitor, the connection capacitor crossing the first gap, connecting the first radiation portion and the second radiation portion;
a feed portion, the feed portion electrically connecting to the first radiation portion for feeding current to the first radiation portion;
a second switch circuit;
a second ground portion, one end of the second ground portion connected to the side of the third radiation portion near the second gap, the other end of the second ground portion grounded through the second switch circuit;
a first connection portion; and
a second connection portion, the first connection portion and the second connection portion spaced apart on both sides of the first gap, the first connection portion connected to a side of the first radiation portion near the first gap, the second connection portion connected to a side of the second radiation portion near the first gap, two opposite ends of the connection capacitor electrically connected to the first connection portion and the second connection portion, and cross the first gap;
wherein the current flows through the first radiation portion and flows towards the second radiation portion through the connection capacitor, the current is further coupled to the third radiation portion to generate radiation signals in different frequency bands;
when the feed portion supplies a current from the feed source to the first radiation portion, the current flows towards two directions, one direction is the current flows to the first gap along the first radiation portion, flows towards the second radiation portion through the first connection portion, the connection capacitor, and the second connection portion, and flows to the third gap along the second radiation portion to excite a first working mode and generate a radiation signal in a first radiation frequency band;
when the feed portion supplies a current, the current will flow to the first gap along the first radiation portion, to excite a second working mode and generate a radiation signal in a second radiation frequency band;
when the feed portion supplies a current, the current flows towards the second gap along the first radiation portion towards another direction, the third radiation portion is coupled to obtain the current, and the current flows to the end along the third radiation portion and to ground through the second ground portion and the second switch circuit, and a third working mode is excited to generate a radiation signal in a third radiation frequency band;

wherein the first working mode is a LTE-A low frequency mode and a frequency of the first radiation frequency band is 700-960 MHz; the second working mode is an LTE-A middle frequency mode and a frequency of the second radiation frequency band is 1710-2170 MHz; the third working mode is an LTE-A high-frequency mode and a frequency of the third radiation frequency band is 2300-2690 MHz.

2. The antenna structure of claim 1, wherein the slot and the three gaps are all filled with an insulating material.

3. The antenna structure of claim 1, wherein the metallic back cover and the metallic side frame are integrally formed with no other gaps and no other insulating slots.

4. The antenna structure of claim 1, wherein the metallic back cover comprises an end portion, a first side portion, and a second side portion, the first side portion and the second side portion are respectively connected to both ends of the end portion, the slot is U-shaped, the slot is defined on a side of the metallic back board near the end portion and extends in a direction of the first side portion and the second side portion.

5. The antenna structure of claim 1, wherein the first gap and the second gap are both defined at the end portion, the first gap is positioned near the first side portion, the second gap is positioned near the second side portion; wherein the third gap is spaced from the first gap, the third gap is defined on the first side portion or the second side portion near the end portion; wherein the first gap, the second gap, and the third gap all penetrate and block the metallic side frame, and communicate with the slot.

6. The antenna structure of claim 1, further comprising a matching circuit, wherein one end of the feed portion is electrically connected to the first radiation portion near the second gap, the other end of the feed portion is electrically connected to a feeding source through the matching circuit; wherein the matching circuit comprises a first capacitor and the first inductor, one end of the first capacitor is electrically connected to the feed portion, the other end of the first capacitor is electrically connected to the first radiation portion, one end of the first inductor is electrically connected between the feed portion and the first capacitor, the other end of the first inductor is grounded.

7. The antenna structure of claim 1, further comprising a first ground portion and a first switch circuit, wherein the first ground portion is spaced apart from the feed portion, one end of the first ground portion is connected to the first radiation portion, the other end of the first ground portion is grounded through the first switch circuit;
wherein the first switch circuit comprises a switching unit and a plurality of switching elements, the switching unit is electrically connected to the first ground portion, the switching elements are connected in parallel to each other, one end of each switching element is electrically connected to the switching unit, the other end of each switching element is grounded;
wherein the switching unit switches the first radiation portion, through the first ground portion, to connect with different switching elements, each switching element has a different impedance.

8. The antenna structure of claim 7, wherein a structure of the second switch circuit is substantially the same as the structure of the first switch circuit.

9. The antenna structure of claim 8, wherein under the control of the switching unit, the first radiation portion is switched to connect with different switching elements to adjust the first radiation frequency band of the first working mode;

wherein the first radiation frequency band is offset towards a lower frequency or offset towards a higher frequency, a low frequency band is adjusted by the first switch circuit, and a high frequency band is adjusted by the second switch circuit.

10. The antenna structure of claim 9, wherein the connection capacitor allows the current of the first working mode to pass, so that the current enters the second radiation portion from the first radiation portion through the connection capacitor, the capacitor also blocks the current in a middle frequency mode and the high frequency mode.

11. The antenna structure of claim 10, further comprises a third switch circuit, wherein one end of the third switch circuit is electrically connected to one of the second connection portion and the second radiation portion, the other end of the third switch circuit is grounded;
wherein when the third switch circuit is turned on, the second radiation portion is grounded through the third switch circuit, and the current flowing to the second radiation portion is grounded through the third switch circuit.

12. The antenna structure of claim 1, further comprises a metallic middle frame, wherein the metallic middle frame is made of metallic material and the metallic side frame is positioned at a periphery of the metallic middle frame.

13. A wireless communication device, comprising:
an antenna structure comprising:
a housing, the housing comprising a metallic side frame and a metallic back board, the metallic side frame positioned at a periphery of the metallic back board, wherein the metallic side frame defines a first gap, a second gap, and a third gap, the metallic back board defines a slot, the slot and the three gaps divide a first radiation portion, a second radiation portion, and a third radiation portion from the metallic side frame; wherein the metallic side frame between the first gap and the second gap forms the first radiation portion, the metallic side frame between the first gap and the third gap forms the second radiation portion, the metallic side frame between the second gap and an endpoint of the slot forms the third radiation portion;
a connection capacitor, the connection capacitor crossing the first gap, connecting the first radiation portion and the second radiation portion;
a feed portion, the feed portion electrically connecting to the first radiation portion for feeding current to the first radiation portion;
a second switch circuit;
a second ground portion, one end of the second ground portion connected to the side of the third radiation portion near the second gap, the other end of the second ground portion grounded through the second switch circuit;
a first connection portion; and
a second connection portion, the first connection portion and the second connection portion spaced apart on both sides of the first gap, the first connection portion connected to a side of the first radiation portion near the first gap, the second connection portion connected to a side of the second radiation portion near the first gap, two opposite ends of the connection capacitor electrically connected to the first connection portion and the second connection portion, and cross the first gap;
wherein the current flows through the first radiation portion and flows towards the second radiation portion through the connection capacitor, the current is further coupled to the third radiation portion to generate radiation signals in different frequency bands;
when the feed portion supplies a current from the feed source to the first radiation portion, the current flows towards two directions, one direction is the current flows to the first gap along the first radiation portion, flows towards the second radiation portion through the first connection portion, the connection capacitor, and the second connection portion, and flows to the third gap along the second radiation portion to excite a first working mode and generate a radiation signal in a first radiation frequency band;
when the feed portion supplies a current, the current will flow to the first gap along the first radiation portion, to excite a second working mode and generate a radiation signal in a second radiation frequency band;
when the feed portion supplies a current, the current flows towards the second gap along the first radiation portion towards another direction, the third radiation portion is coupled to obtain the current, and the current flows to the end along the third radiation portion and to ground through the second ground portion and the second switch circuit, and a third working mode is excited to generate a radiation signal in a third radiation frequency band;
wherein the first working mode is a LTE-A low frequency mode and a frequency of the first radiation frequency band is 700-960 MHz; the second working mode is an LTE-A middle frequency mode and a frequency of the second radiation frequency band is 1710-2170 MHz; the third working mode is an LTE-A high-frequency mode and a frequency of the third radiation frequency band is 2300-2690 MHz.

14. The wireless communication device of claim 13, further comprising a circuit board, an USB connector, and a speaker, the USB connector and the speaker are spaced on the circuit board, the USB connector is positioned adjacent to a middle location of the first radiation portion and is insulated from the first radiation portion through the slot; wherein the speaker is positioned at one side of the first radiation portion and corresponds to the first gap.

15. The wireless communication device of claim 14, wherein the feed portion and the first ground portion are respectively arranged on opposite sides of the USB connector, the connection capacitor is arranged corresponding to the speaker, and the matching circuit, the first switch circuit and the second switch circuit are positioned on the circuit board.

16. The wireless communication device of claim 14, wherein the antenna structure further comprises a first ground portion, and a first switch circuit, the first ground portion is spaced apart from the feed portion, one end of the first ground portion is connected to the first radiation portion, the other end of the first ground portion is grounded through the first switch circuit;
wherein the first switch circuit comprises a switching unit and a plurality of switching elements, the switching unit is electrically connected to the first ground portion, the switching elements are connected in parallel to each other, one end of each switching element is electrically connected to the switching unit, the other end of each switching element is grounded;
wherein the switching unit switches the first radiation portion, through the first ground portion, to connect with different switching elements, each switching element has a different impedance;

wherein a structure of the second switch circuit is substantially the same as the structure of the first switch circuit.

* * * * *